Nov. 15, 1949  G. E. SMITH  2,488,245
PIPE JOINT
Filed Oct. 6, 1947  2 Sheets-Sheet 2

Inventor
Grady E. Smith
By E. V. Hardway,
Attorney

Patented Nov. 15, 1949

2,488,245

UNITED STATES PATENT OFFICE 2,488,245

PIPE JOINT

Grady E. Smith, Houston, Tex., assignor to Standard Concrete Products Corp., Houston, Tex., a corporation of Texas Application October 6, 1947, Serial No. 778,159

2 Claims. (Cl. 285—112)

This invention relates to a pipe joint and has more particular relation to a joint for connecting adjacent sections of under ground pipe such as storm sewer pipe and the like.

Under ground pipe through which liquid flows at high velocity is liable to admit through leaky joints, surrounding earth formation particularly if the pipe runs through fine sand such as quick sand. This causes cavities to form about the joints which leak resulting in a caving in of the surface and since such pipes are often laid under streets this caving in removes the paving support thus resulting in serious injury to the paving.

It is an object of the present invention to provide a pipe joint which may be easily rendered leak proof and which may be easily and quickly repaired in case a leak should develop.

Other objects and advantages will be apparent from the following specification which is illustrated by the accompanying drawings, wherein.

Figure 1:
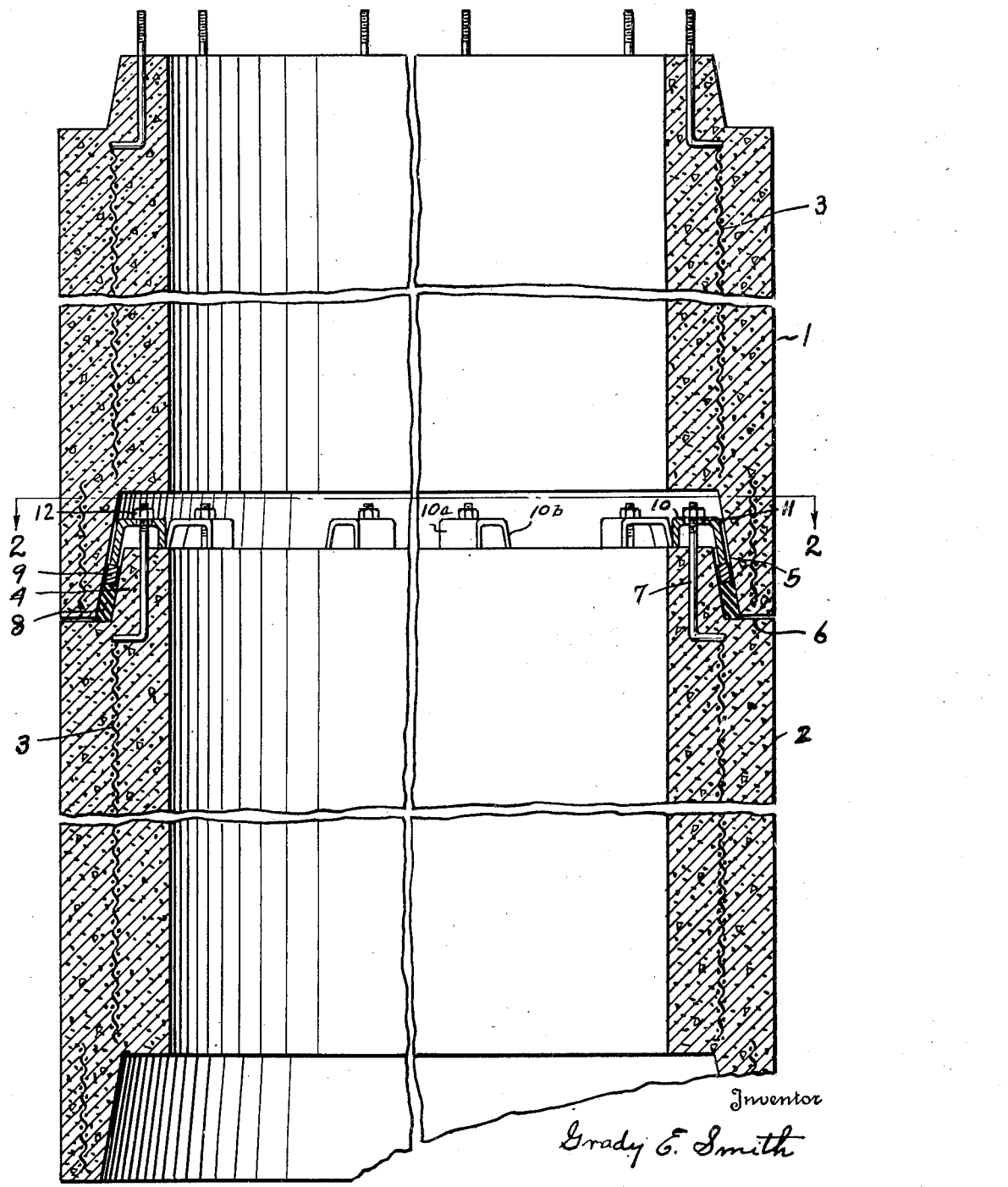
Figure 1 is a horizontal sectional view of the joint.
Figure 2:
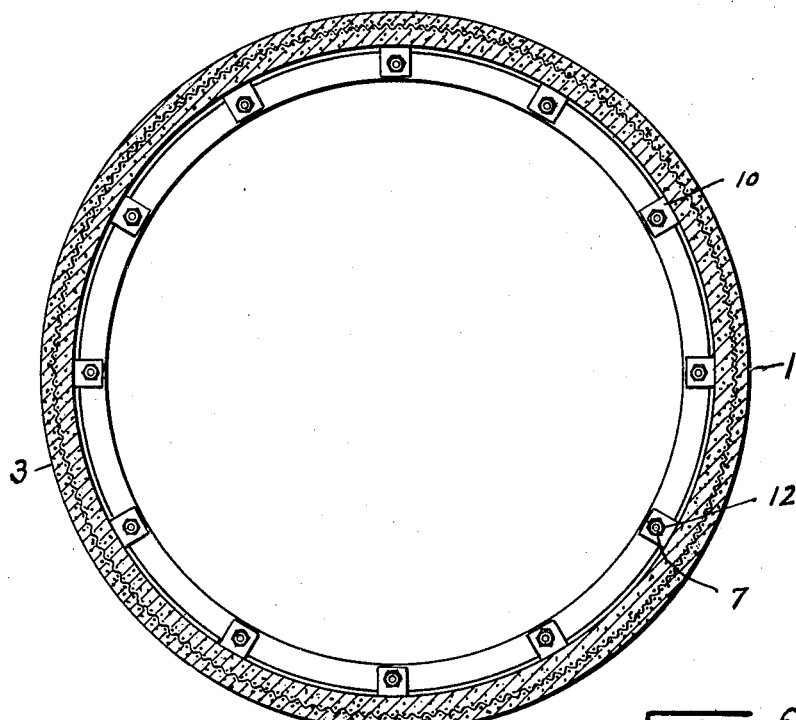
Figure 2 is a cross sectional view taken on the line 2—2 of Figure 1.
Figure 3:
Figure 3 is a transverse sectional view of a clamp ring employed.
Figure 4:
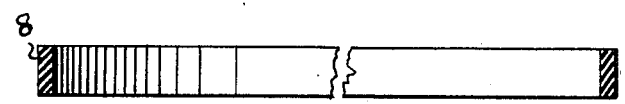
Figure 4 is a transverse sectional view of a seal ring employed.
Figure 5:
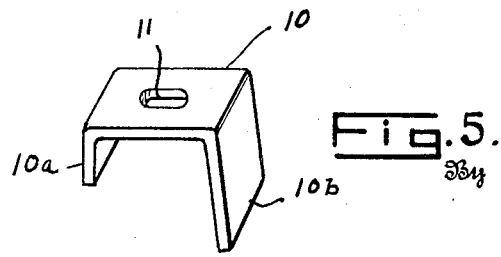
Figure 5 is a perspective view of a clamp lug employed.

Referring now more particularly to the drawings, wherein like numerals of reference designate similar parts in each of the figures, the numerals 1 and 2 designate, respectively, adjoining sections of a pipe. As illustrated these are reinforced, concrete sections of a storm sewer pipe. As shown each section is reinforced, substantially throughout with suitable wire mesh, or other, reinforcing 3.

The adjacent ends of the sections are formed one with a reduced tapering pin 4 and the other with a flared box 5 to receive said pin. The reduction of the pin produces an external, annular shoulder 6 at the base of the pin.

Clamp bolts 7 are embedded in the pin 4 and extend out longitudinally beyond said pin with said extended ends being externally threaded. The inner, or embedded, ends of said bolts are, preferably, overturned and welded to the adjacent end of the reinforcing 3.

Surrounding the pin 4 and within the box 5 and abutting the shoulder 6 there is a resilient seal ring 8 and abutting this seal ring, on the opposite side from the shoulder 6, there is a clamp ring 9 of rigid material.

The clamp bolts 7 are spaced apart around the pin 4 and there are the clamp lugs 10 having openings 11 to receive said bolts. Each lug has an inner leg 10a which rests against the end of the pin 4 and a longer outer leg 10b which rests against the clamp ring 9 and clamp nuts 12 are screwed onto said bolts into abutting relation with said lugs and when the nuts are screwed home pressure will be applied to the clamp ring 9 and to the seal ring 8 thus clamping the seal ring against the shoulder 6 and expanding the seal ring into sealing relationship with both the pin and the box to form a fluid tight joint.

In case leakage develops a workman may enter the pipe and stop the leak by merely tightening up the nuts; or if parts are worn out, they may be replaced, readily, by said workman in an obvious manner.

The drawings and description are illustrative only while the broad principle of the invention will be defined by the appended claims.

What I claim is:

1. A pipe joint comprising, a reduced pin on an end of a pipe section with an annular external shoulder at the base of said pin, a box on the adjacent end of another pipe section and which receives said pin, an annular seal ring around the pin and between it and the box and in contact with said shoulder, a clamp ring around the pin in contact with the seal ring, independent lugs spaced apart around the end of the pin, each lug having an outer leg in contact with the clamp ring and a shorter leg in contact with the pin end and means for forcing said outer legs against the clamp ring to apply a compressive force to the seal ring.

2. A pipe joint comprising, a reduced tapering pin on an end of a pipe section and an external annular shoulder at the base of said pin, an internally flared box on the adjacent end of another pipe section and which receives said pin, an annular seal ring around the pin and between it and the box and which abuts said shoulder, a clamp ring around the pin in contact with the seal ring, independent lugs spaced apart around the end of the pin, each lug having an inner leg which bears against the end of the pin and an outer leg which is longer than the inner leg and which bears against the clamp ring, each lug also having a bolt hole therethrough, bolts anchored to the pin and extending through the holes in said lugs and clamp nuts threaded onto said bolts and operative against the lugs to cause the outer legs to apply a compressive force to the seal ring as the nuts are screwed toward home position.

GRADY E. SMITH.

REFERENCES CITED

The following references are of record in the file of this patent:

UNITED STATES PATENTS

| Number | Name | Date |
|---|---|---|
| 1,856,788 | Seaberg | May 3, 1932 |
| 2,158,829 | Miller | May 16, 1939 |
| 2,162,431 | Helms et al. | June 13, 1939 |
| 2,325,469 | Boissou | July 27, 1943 |